US012736036B2

(12) United States Patent
Senyuez et al.

(10) Patent No.: US 12,736,036 B2
(45) Date of Patent: Sep. 15, 2026

(54) RADIAL PISTON PUMP, METHOD FOR OPERATING A RADIAL PISTON PUMP, AND STEERING SYSTEM

(71) Applicant: Pump Technology Solutions PS GmbH, Berlin (DE)

(72) Inventors: Ugur Senyuez, Berlin (DE); Volker Schlecker, Berlin (DE); Ralf Zischka, Berlin (DE); Manuela Linek, Berlin (DE)

(73) Assignee: Pump Technology Solutions PS GmbH (DE)

( * ) Notice: Subject to any disclaimer, the term of this patent is extended or adjusted under 35 U.S.C. 154(b) by 0 days.

(21) Appl. No.: 18/822,746

(22) Filed: Sep. 3, 2024

(65) Prior Publication Data

US 2025/0075689 A1 Mar. 6, 2025

(30) Foreign Application Priority Data

Sep. 6, 2023 (DE) ..................... 10 2023 123 961.9

(51) Int. Cl.
*F04B 1/0538* (2020.01)
*B62D 5/12* (2006.01)
(Continued)

(52) U.S. Cl.
CPC .............. *F04B 1/0538* (2013.01); *B62D 5/12* (2013.01); *F04B 1/0408* (2013.01); (Continued)

(58) Field of Classification Search
CPC ........ B62D 5/12; F04B 1/0408; F04B 1/0421; F04B 1/0536; F04B 1/0538
See application file for complete search history.

(56) References Cited

U.S. PATENT DOCUMENTS

| | | | |
|---|---|---|---|
| 5,842,837 | A | 12/1998 | Nakayoshi et al. |
| 7,204,565 | B2 | 4/2007 | Hinz et al. |

(Continued)

FOREIGN PATENT DOCUMENTS

| | | | |
|---|---|---|---|
| CN | 1 03 742 401 | A | 4/2014 |
| DE | 28 31 876 | A1 | 2/1980 |

(Continued)

*Primary Examiner* — Laert Dounis

(74) *Attorney, Agent, or Firm* — Donald S. Showalter; GrayRobinson, P.A.

(57) ABSTRACT

A radial piston pump for delivering a pressure medium to a consumer may include a housing in which cylinder bores are arranged radially to a longitudinal axis and in each of which a radially displaceable piston is arranged. The pistons form a piston row lying in a radial plane. The radial piston pump furthermore has an eccentric shaft arranged coaxially to the longitudinal axis which sets the pistons in a linearly oscillating reciprocating motion, wherein pressure medium flows into cylinder chambers through suction openings formed in the piston in the region of a bottom dead centre of the stroke movement, from a suction chamber which is supplied with pressure medium through a suction port. The pressure medium flows out of the cylinder chambers to a pressure outlet through pressure openings owing to movement of the pistons towards the top dead centre. At least one further piston row is provided planar-parallel to the piston row. Further cylinder bores are provided in the housing, in each of which a piston of the further piston row is radially displaceably arranged. The eccentric shaft sets the pistons of the further piston row in a linearly oscillating reciprocating motion.

14 Claims, 2 Drawing Sheets

(51) Int. Cl.

| | |
|---|---|
| ***F04B 1/0408*** | (2020.01) |
| ***F04B 1/0421*** | (2020.01) |
| ***F04B 7/04*** | (2006.01) |
| ***F04B 9/04*** | (2006.01) |

(52) U.S. Cl.

CPC .............. *F04B 1/0421* (2013.01); *F04B 7/04* (2013.01); *F04B 9/045* (2013.01)

(56) References Cited

U.S. PATENT DOCUMENTS

| | | | | |
|---|---|---|---|---|
| 2006/0213715 A1 * | 9/2006 | Krieger | B62D 7/142 180/408 |
| 2008/0121216 A1 * | 5/2008 | Shafer | F04B 1/0413 123/456 |

FOREIGN PATENT DOCUMENTS

| | | | | | |
|---|---|---|---|---|---|
| DE | 3833560 | A1 * | 4/1989 | F04B 23/026 |
| DE | 3935116 | A1 * | 5/1990 | F04B 1/0538 |
| DE | 40 24 243 | A1 | 2/1991 | |
| DE | 4034267 | A1 * | 5/1991 | F04B 53/1075 |
| DE | 41 08 915 | A1 | 9/1992 | |
| DE | 43 36 673 | A1 | 5/1995 | |
| DE | 196 34 822 | A1 | 3/1997 | |
| DE | 10 2004 024 060 | A1 | 12/2005 | |
| DE | 10 2009 000 069 | A1 | 7/2010 | |
| DE | 10 2011 001 979 | A1 | 10/2012 | |
| DE | 10 2011 053 148 | A1 | 2/2013 | |
| DE | 10 2012 104 816 | A1 | 12/2013 | |
| DE | 11 2018 002 523 | T5 | 2/2020 | |
| EP | 0432037 | A1 | 6/1991 | |
| EP | 1 988 004 | B1 | 6/2013 | |
| FR | 1464906 | A * | 1/1967 | F04B 1/0408 |
| FR | 1595692 | A | 6/1970 | |
| GB | 1231997 | A | 5/1971 | |
| GB | 2026089 | A | 1/1980 | |
| JP | H04 173 478 | A | 6/1992 | |
| WO | 91/002157 | A1 | 2/1991 | |
| WO | 2010/079011 | A1 | 7/2010 | |
| WO | 2018/212844 | A1 | 11/2018 | |

* cited by examiner

RADIAL PISTON PUMP, METHOD FOR OPERATING A RADIAL PISTON PUMP, AND STEERING SYSTEM

CROSS REFERENCE TO RELATED APPLICATIONS

Priority is hereby claimed under 35 U.S.C. Section 119 to German Patent Application No. 10 2023 123 961.9 entitled RADIAL PISTON PUMP, METHOD FOR OPERATING A RADIAL PISTON PUMP, AND STEERING SYSTEM which was filed in the German Patent Office on Sep. 6, 2023.

STATEMENT REGARDING FEDERALLY SPONSORED RESEARCH AND DEVELOPMENT

Not applicable.

INCORPORATION BY REFERENCE

German Patent Application No. 10 2023 123 961.9, filed Sep. 6, 2023, entitled RADIAL PISTON PUMP, METHOD FOR OPERATING A RADIAL PISTON PUMP, AND STEERING SYSTEM is expressly incorporated herein by reference in its entirety to form part of the present disclosure.

FIELD OF THE INVENTION

The invention concerns a radial piston pump for delivering a pressure medium to a consumer, having a housing in which cylinder bores are provided which are arranged radially to a longitudinal axis and in each of which a radially displaceable piston is arranged.

The invention furthermore concerns a method for operating a radial piston pump for delivering a pressure medium to a consumer.

The invention furthermore concerns a steering system for a vehicle, in particular a utility vehicle, with at least two steerable wheel axles.

BACKGROUND OF THE INVENTION

A generic radial piston pump for delivering a pressure medium is known from DE 10 2011 001 979 A1.

For the further prior art, reference is also made to DE 10 2011 053 145 A1.

Radial piston pumps are often used in motor vehicles, and serve for example as lubricant pumps for internal combustion engines or for gearboxes of vehicles, as pressure medium pumps for hydraulic actuators for providing power as steering assistance, or for initiating actuating movements on clutches or within an active suspension of a vehicle. Radial piston pumps are used in preference to vane pumps if a higher pressure level is desired at a hydraulic consumer.

Radial piston pumps have a housing in which cylinder bores are provided which are arranged radially to a longitudinal axis. A radially displaceable piston is arranged in each cylinder bore. Usually, in radial piston pumps, pressure medium such as hydraulic oil is drawn into a displacement chamber or cylinder chamber between the piston and the cylinder bore via suction openings arranged radially to the respective cylinder bore, and expelled through pressure openings arranged preferably centrally to each cylinder bore. Here, wall parts of the piston and wall parts of the cylinder bore interact.

Radial piston pumps thus deliver pressure medium discontinuously into part volumes on each revolution of a drive cam or eccentric shaft, which causes the travel movements of each piston in the respective cylinder bore.

DE 43 36 673 A describes a radial piston pump which has a number of pistons inserted in cylinder bores of a pump housing, wherein each piston is pressurized by a spring which rests on a stopper closing the cylinder bore.

Radial piston pumps have proved advantageous for many applications, in particular in vehicles and above all also in utility vehicles; however, it would be desirable to optimize radial piston pumps further in order to expand their application possibilities.

BRIEF SUMMARY OF THE INVENTION

The prior art describes steering systems for vehicles, in particular utility vehicles and here in particular for utility vehicles in the agricultural sector, which have at least two steerable wheel axles. In normal operation, the steerable wheel axles are each deflected by an electric and/or hydraulic steering device, so that the utility vehicle can be steered or controlled at two axles. For such vehicles, it is necessary to configure the steering system such that, in addition to the electric and/or hydraulic steering device which, in normal operation, ensures deflection of the steerable wheel axles, in particular deflection of wheels of the wheel axles, there is also an emergency steering function. For this, it is known that an emergency steering pump is assigned to each axle so as to allow the steerable wheel axles to remain steerable or controllable in an emergency. The arrangement or provision of such emergency steering pumps, which may be radial piston pumps, entails corresponding costs and corresponding complexity of assembly and maintenance.

The present invention is based on the object of providing a radial piston pump which is improved in comparison with the prior art, in particular has improved functionality.

The present invention is furthermore based on the object of providing a method for operating a radial piston pump, which is improved in comparison with the previous method, in particular has improved functionality.

The present invention is furthermore based on the object of providing a steering system for a vehicle, in particular a utility vehicle with at least two steerable wheel axles, in which the at least two steerable wheel axles remain deflectable even in an emergency, wherein the steering system is simple and economic to produce and easy to maintain.

The radial piston pump according to the invention for delivering a pressure medium to a consumer has a housing in which cylinder bores are provided, which are arranged radially to a longitudinal axis and in each of which a radially displaceable piston is arranged. The pistons form a piston row lying in a radial plane. The radial piston pump furthermore has an eccentric shaft arranged coaxially to the longitudinal axis, which sets the pistons in a linearly oscillating reciprocating motion, wherein pressure medium flows into cylinder chambers through suction openings formed in the pistons in the region of a bottom dead center of the stroke movement, from a suction chamber which is supplied with pressure medium through a suction port. The pressure medium flows out of the cylinder chambers to a pressure outlet through pressure openings, owing to movement of the pistons towards the top dead center.

According to the invention, it is provided that at least one further piston row is provided planar-parallel to the piston row, wherein further cylinder bores are provided in the housing, in each of which a piston of the further piston row is radially displaceably arranged, and wherein the eccentric shaft sets the pistons of the further piston row in a linearly oscillating reciprocating motion.

The design of the radial piston pump according to the invention such that at least one further piston row is provided planar-parallel to the piston row, which is provided in conventional radial piston pumps and which in the context of the invention is sometimes also called the first piston row, leads to an expansion of the functionality or application possibilities of such a radial piston pump. By means of the further piston row, which in the context of the invention is sometimes also described as the second piston row for the purpose of distinction, a second pressure medium stream can be generated which, as required, may either be superposed over the first pressure medium stream generated by the first piston row or replace this, or serve permanently or when required to supply pressure medium to or operate a further consumer, which in the context of the invention is sometimes also called the second consumer.

With the solution according to the invention, a further piston row can be implemented easily, reliably and economically by the provision of further cylinder bores in the housing, in each of which a piston of the further piston row is radially displaceably arranged. Thus the eccentric shaft, which is provided in any case to set the pistons of the first piston row in a linearly oscillating reciprocating motion, may also be used to set the pistons of the further piston row in a linearly oscillating reciprocating motion.

In the scope of the invention, it may also be provided that not only one further piston row is provided, but also a third, fourth or even further piston rows, each of which run planar-parallel to the first piston row, i.e. the piston rows each run in a radial plane relative to the longitudinal axis or the eccentric shaft.

Within the scope of the invention, it may be provided that the pistons of the further piston row are arranged offset, or shifted by a defined center point angle or defined arc, relative to the pistons of the first piston row, whereby the quietness of running and/or stability of the radial piston pump may in some cases be improved.

Within the scope of the invention, it is provided that each piston row has at least two pistons, preferably two to sixteen pistons, in particular four to twelve pistons, and quite particularly preferably six to ten, in particular eight pistons are provided per piston row. The pistons of a piston row are preferably arranged with equal angular spacing.

Within the scope of the invention, it is preferably provided that all piston rows have the same number of pistons, preferably six to ten, in particular eight pistons. Depending on application however, it is also conceivable that a piston row, for example the first piston row, has more pistons than the further piston row.

It is advantageous if the eccentric shaft is configured as a double eccentric shaft with at least one first eccentric region which sets the pistons of the piston row in a reciprocating motion, and at least one second eccentric region which sets the pistons of the further piston row in a reciprocating motion.

It may also be provided that the eccentric shaft has a third, a fourth or further eccentric regions. It has been found that it may be advantageous if the eccentric regions, in particular the first eccentric region and the second eccentric region, are not formed identically. This may achieve for example that the stroke of the pistons of a piston row, for example the first piston row, is greater than the stroke of the pistons of the further piston row, e.g. the second piston row (or vice versa).

It may however also be provided that the eccentric regions are formed identically; this may be the case in particular if an even stroke is desired, or a change or adjustment of the stroke or stroke movement of the piston is achieved by other measures, e.g. by a slide ring and or a slide bush arranged between the eccentric shaft or an eccentric region of the eccentric shaft and the pistons of a piston row.

Within the scope of the invention, it may also be provided that a slide ring and/or a slide bush forms the respective eccentric region.

According to the invention, it may furthermore be provided that pressure medium flows into cylinder chambers from the suction chamber through suction openings formed in the pistons of the further piston row in the region of a bottom dead center of the stroke movement, and the pressure medium flows out of the cylinder chambers via pressure openings owing to a movement of the pistons towards the top dead center.

It has proved advantageous if the pistons of the further piston row are arranged similarly to the pistons of the first piston row, and in particular the same suction chamber is used for drawing pressure medium into the respective cylinder chamber (or displacement chamber).

The pressure medium is also expelled or flows out from the respective cylinder chamber through pressure openings, the arrangement or form of which has been known for a long time in the prior art, for which explicit reference is made to DE 10 2011 011 979 A1.

It has been found to be advantageous if the cylinder bores receiving the pistons of the piston rows are open towards a suction portion or suction chamber on their sides facing the eccentric, and are preferably sealed pressure-tightly on their opposite sides by a respective closing stopper which is droplet-shaped in longitudinal section. Evidently the invention is not restricted thereto, and other designs may be implemented advantageously. Insofar as a closing stopper is provided, it may be advantageous if an end of a coil compression spring rests on the inside of each closing stopper. The other end of the coil compression spring may rest preferably on a floor of the internally hollow piston and apply a pressure force to the piston. Such a structure, in particular also using a coil compression spring, may also be suitable independently of the design of a closing stopper.

This is a particularly advantageous structural design which is known from the prior art and in particular may also be suitable for the radial piston pump according to the invention.

It is pointed out that the term “cylinder bore” does not mean that a boring process must be used for production; although production of the cylinder bores by a boring process is advantageous, the cylinder bores may however also be provided in another fashion.

According to the invention, it may furthermore be provided that a further pressure outlet is formed in the housing and the pistons of the further piston row deliver pressure medium to the further pressure outlet.

It has proved advantageous if a further pressure outlet is formed in the housing of the radial piston pump, and the pistons of the further piston row deliver pressure medium to the further pressure outlet.

In principle, it is also possible that the pistons of the further piston rows deliver the pressure medium to a pressure outlet, at which also the pistons of the first piston row expel the pressure medium they deliver.

Insofar as more than one further piston row is provided, in some cases further pressure outlets may also be provided, e.g. a third pressure outlet and a fourth pressure outlet.

According to the invention, it may furthermore be provided that the pressure outlet is connected to a first consumer and the further pressure outlet is connected to a second consumer, in order to deliver pressure medium from the respective pressure outlet to the respective connected consumer.

Because the further pressure outlet-which may also be called the second pressure outlet-is connected to a second consumer, in a particularly advantageous fashion a further or second pressure medium stream or pressure medium circuit can be created.

In an alternative embodiment also according to the invention, it may also be provided that the pressure outlet and the further pressure outlet are connected to the same consumer in order to deliver pressure medium to the same consumer.

Such a design has also proved suitable.

It is advantageous if a control device is provided in order to deliver pressure medium as required from only one or from both pressure outlets to the same consumer.

The control device may be configured so as to deliver as required only the pressure medium delivered by the first piston row or only the pressure medium delivered by the further piston row to the same consumer.

This can for example ensure that, if the consumer requires only a small pressure medium stream or only a small volume of pressure medium, the consumer is supplied with pressure medium from only one piston row, preferably from the piston row which delivers a smaller volume. It may be provided that the pistons of the other piston row are designed to deliver a greater volume. Thus the control device may supply the consumer with a suitable or optimized pressure medium stream from the one or the other piston row as required. In some cases, it may also be provided that pressure medium delivered by both piston rows is supplied to the consumer, in particular if there is a particularly high demand.

Such a controller may be suitable in particular if the two piston rows deliver different volumes, or if the pressure medium originating from the two piston rows reaches the consumer at a different pressure. Such a design may however also be suitable if the two piston rows are formed identically or deliver an identical volume of pressure medium.

Within the scope of the invention, the piston rows may have an identical or different geometric delivery volume.

According to the invention, it may be provided that the piston rows are configured such that the volume of pressure medium delivered by the piston row on a rotation of the eccentric shaft differs from the volume delivered by the further piston row, and/or the radial piston pump is configured such that the pressure of the pressure medium originating from the piston row differs from the pressure of the pressure medium originating from the further piston row.

It has proved advantageous if the piston rows deliver a different volume and/or the pressure medium originating from the piston rows, or the corresponding pressure medium stream, has a different pressure.

Such a design may be suitable both if the piston rows supply the pressure medium to the same consumer, and also if the piston rows supply the pressure medium to different consumers. In the latter case in particular, a different volume of pressure medium or a different pressure of pressure medium may be set in order to suit the specific circumstances of the respective consumer, without a second radial piston pump being necessary for this.

It is advantageous if a dedicated slide ring is provided for each piston row, wherein the slide rings are each arranged between the eccentric shaft and the respective piston row.

The slide rings may be arranged directly on the eccentric shaft. In particular, the slide rings may be arranged directly on the respective eccentric regions of the eccentric shaft. The slide rings may preferably act directly or indirectly on a floor of the piston of the respective piston row.

It is an advantage of this slide ring that, as well as improved slide properties, the stroke of the piston of the respective piston row can easily be varied without having to change the eccentric shaft. This allows, inter alia, the use of identical eccentric shafts for different radial piston pumps, and the stroke of the pistons can be adapted by means of the slide ring fitted to the eccentric shaft.

In the context of the radial piston pump according to the invention, the slide rings in particular allow the eccentric regions of the piston rows to be formed identically and a different stroke to be set by means of different slide rings.

It is advantageous if the thickness of the slide ring of the piston row in the radial direction differs from that of the slide ring of the further piston row.

Alternatively or in addition to the slide ring, a slide bush may also be provided.

According to the invention, it may furthermore be provided that the radial piston pump is configured as an emergency steering pump for a vehicle, in particular a utility vehicle, wherein the piston row is configured to deliver pressure medium to a wheel steering gear or a steering cylinder of a steering system of a first wheel axle, and the further piston row is configured to deliver pressure medium to a wheel steering gear or a steering cylinder of a steering system of a second wheel axle.

It has proved particularly suitable if the radial piston pump is configured as an emergency steering pump for a vehicle, in particular a utility vehicle, preferably an agricultural utility vehicle. It has been found that, in particular in utility vehicles having two steerable wheel axles, there is a need for emergency steering pumps. In the prior art, an independent emergency steering pump is used for each wheel axle, and serves to deflect the wheel axle if the steering device (electric and/or hydraulic) of the steering system actually provided for this has a fault or requires support.

The function of emergency steering pumps is known in principle from the prior art, in particular for deflecting steerable wheel axles. For this, usually the wheels of the wheel axles are deflected. It may be provided to pressurize a wheel steering gear with pressure medium from the emergency steering pump, or to pressurize a steering cylinder of the steering system or steering device with pressure medium.

Use of the radial piston pump according to the invention as an emergency steering pump is quite particularly suitable since, in this way, considerable costs can be saved without fear of loss of functionality. Furthermore, the maintenance and assembly complexity is also reduced.

The present invention also concerns a method for operating a radial piston pump for delivering a pressure medium to a consumer, wherein the radial piston pump has a housing in which cylinder bores are provided which are arranged radially to a longitudinal axis and in each of which a radially displaceable piston is arranged, wherein the pistons form a piston row lying in a radial plane, and wherein the pistons are set in a linearly oscillating reciprocating motion by an eccentric shaft arranged coaxially to the longitudinal axis, and wherein pressure medium flows into cylinder chambers through suction openings of the pistons in the region of a bottom dead center of the stroke movement, from a suction chamber which is supplied with pressure medium through a suction port, under a vacuum created by the movement of the pistons towards the bottom dead center, and wherein the pressure medium is delivered via pressure openings to a pressure outlet on movement of the pistons towards the top dead center.

According to the invention, in the context of the method, at least one further piston row is provided planar-parallel to the piston row. Here, further cylinder bores are provided in the housing, in each of which a piston of the further piston row is radially displaceably arranged. The pistons of the further piston row are set in a linearly oscillating reciprocating motion by the eccentric shaft. The pressure medium delivered by the piston row and the further piston row is supplied to the same consumer, or the pressure medium delivered by the piston row is supplied to a first consumer and the pressure medium delivered by the further piston row is supplied to a second consumer.

The method according to the invention for operating a radial piston pump particularly advantageously allows pressure medium from the piston row and the at least one further piston row, or from both piston rows, to be supplied to one and the same consumer, or to supply pressure medium to two consumers, i.e. a first consumer and a second consumer, each from a respective piston row. Operation of the radial piston pump according to the invention therefore allows the radial piston pump to fulfil a greater functionality. The structure of the radial piston pump particularly advantageously allows a simple, economic and robust construction. With respect to further advantages, reference is made in particular to the statements made above and below with respect to the radial piston pump.

It is advantageously provided that, when the pressure medium is delivered to the same consumer, as required only the pressure medium delivered by the first piston row or only the pressure medium delivered by the further piston row or the pressure medium delivered by both piston rows is supplied to the consumer.

According to the invention, within the scope of the method, it may furthermore be provided that the volume of the pressure medium which the piston row delivers on a rotation of the eccentric shaft differs from the volume delivered by the further piston row, and/or the pressure of the pressure medium originating from the piston row differs from the pressure of the pressure medium originating from the further piston row.

The method according to the invention thus allows, with one radial piston pump, two different consumers to be operated or loaded with different pressures and/or volumes of pressure medium, or the pressure medium stream to be adjusted accordingly. The method according to the invention also allows the same consumer to be operated or loaded with different pressure and/or volume of pressure medium as required, or the pressure medium stream to be adjusted accordingly.

According to the invention, also within the scope of the method, it may be provided that on operation of the radial piston pump such that the pressure medium delivered by the piston row is supplied to a first consumer and the pressure medium delivered by the further piston row is supplied to a second consumer, it is provided that the first consumer is a first steerable wheel axle and the second consumer is a second steerable wheel axle of a utility vehicle, wherein preferably it is provided that the radial piston pump is configured as an emergency steering pump, wherein the first consumer is a wheel steering gear or a steering cylinder of a steering system of the first wheel axle, and the second consumer is a wheel steering gear or a steering cylinder of a steering system of the second wheel axle.

The method according to the invention is particularly suitable for supplying a first consumer and a second consumer. Quite particularly, the method according to the invention is suitable if the two consumers are a first steerable wheel axle and a second steerable wheel axle, and the radial piston pump serves as an emergency steering pump.

The present invention also concerns a steering system for a vehicle, in particular for a utility vehicle, with at least two steerable wheel axles which in normal operation can each be deflected by a respective electric and/or hydraulic steering device. The steering system here also has an emergency steering pump which according to the invention is configured as a radial piston pump. In the steering system according to the invention, pressure lines are provided in order to supply a pressure medium delivered by the piston row to a wheel steering gear or a steering cylinder of a steering device of the first wheel axle. Furthermore, further pressure lines are provided in order to supply a pressure medium delivered by the further piston row to a wheel steering gear or a steering cylinder of a steering device of the second wheel axle.

A steering system configured in this fashion has proved particularly suitable in particular for utility vehicles, preferably for agricultural utility vehicles. With such a steering system, an emergency steering function can be implemented in a simple and economic fashion. Here it is sufficient if the emergency steering pump is configured as a radial piston pump and designed according to the invention. The use of two radial piston pumps is not necessary. This significantly reduces the costs and assembly complexity. Furthermore, the weight of the utility vehicle is reduced, as are the maintenance and repair costs.

It is pointed out that the term “pressure lines” does not mean that multiple pressure lines to the respective consumer need be provided; in some cases, only one pressure line leading to the consumer may be sufficient.

Features described in connection with one of the subjects of the invention, namely resulting from the radial piston pump according to the invention, the method according to the invention for operating a radial piston pump, or the steering system according to the invention, may also be advantageously implemented for the other subjects of the invention. Similarly, advantages described in connection with one of the subjects of the invention may be understood to relate also to the other subjects of the invention.

It is pointed out in addition that terms such as “comprising”, “including” or “having” do not exclude other features or steps. Furthermore, terms such as “a” or “the” which refer to a single step or feature do not exclude pluralities of features or steps, and vice versa.

In a puristic embodiment of the invention however, it may also be provided that the features presented by the terms “comprising”, “including” or “having” are listed comprehensively. Accordingly, in the context of the invention, one or more lists of features may be considered as comprehensive, e.g. when considered for each claim respectively. The invention may for example consist exclusively of the features listed in claim 1.

It is pointed out that terms such as “first” or “second” etc. are used primarily for reasons of distinguishability of respective device or method features, and do not necessarily indicate that features are mutually conditional or stand in relation to one another.

Exemplary embodiments of the invention are described in more detail below with reference to the drawings.

DETAILED DESCRIPTION

Figure 1:
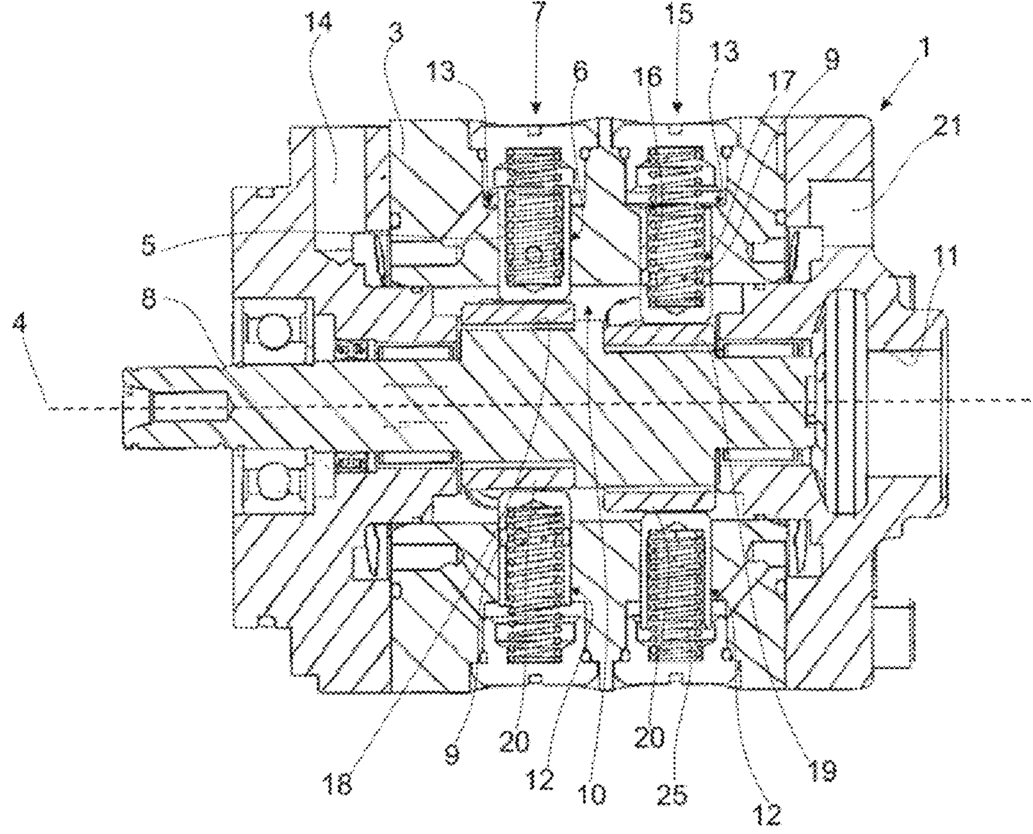
FIG. 1 shows a cross-section through a possible embodiment of a radial piston pump.

As evident from FIGS. 1 and 2, the radial piston pump 1 according to the invention for delivering a pressure medium to a consumer 2, which is also referred to below as the first consumer 2, has a housing 3 in which multiple cylinder bores 5 are provided which are arranged radially to a longitudinal axis 4.

In the exemplary embodiment, six to ten, preferably eight cylinder bores 5 are provided. A radially displaceable piston 6 is arranged in each of the cylinder bores 5. The pistons 6 form a piston row 7 lying in a radial plane. The radial plane here refers to the longitudinal axis 4. In this exemplary embodiment, the piston row 7 is also described as the first piston row 7.

The radial piston pump 1 furthermore has an eccentric shaft 8 which is arranged coaxially to the longitudinal axis 4 and sets the pistons 6 in a linearly oscillating reciprocal motion. When the piston 6 is in the region of a bottom dead center of the stroke movement, pressure medium is drawn into a cylinder chamber 12 through suction openings 9 formed in the piston 6, from a suction chamber 10 which is supplied with pressure medium through a suction port 11. The cylinder chamber 12 may here be described as a displacement chamber.

By a movement of the piston 6 towards the top dead center, the pressure medium is pressed out of the cylinder chamber 12 to a pressure outlet 14, or flows in the direction of the pressure outlet 14, through pressure openings 13. By deviation from the design of conventional radial piston pumps, the radial piston pump 1 according to the invention, as illustrated for example in the exemplary embodiment, has at least one further piston row 15 arranged planar-parallel to the first piston row 7. The further piston row 15 is also called the second piston row 15. Further cylinder bores 16 are provided in the housing 3, in each of which a piston 17 of the further piston row 15 is radially displaceably arranged. The eccentric shaft 8 sets the pistons 17 of the further piston row 15 in a linearly oscillating reciprocating motion.

It is pointed out that the radial piston pump 1 illustrated in the exemplary embodiment is particularly advantageous, although deviations therefrom are possible. In particular, a third piston row or a fourth piston row or even further piston rows may also be provided, which are preferably identical in structure to the first piston row 7 or second piston row 15.

In the exemplary embodiment, it is provided that the second piston row 15 also has six to ten, preferably eight pistons 17, i.e. that a corresponding number of cylinder bores 16 is provided.

In the exemplary embodiment, it is furthermore provided that pressure medium flows into a cylinder chamber 12 through suction openings 9 formed in the pistons 17 in the region of a bottom dead center of the stroke movement. On movement of the pistons 17 towards the top dead center, the pressure medium flows out of the cylinder chamber 12 again or is pressed out through pressure openings 13.

The structure of the cylinder bores 16 and pistons 17 may preferably be identical to the structure of the cylinder bores 5 and pistons 6.

In the exemplary embodiment, it may be provided that the cylinder bores 5 or pistons 6 have a different diameter and/or different length from the cylinder bores 16 or pistons 17.

In the exemplary embodiment, the eccentric shaft 8 is configured as a double eccentric shaft. The eccentric shaft 8 here has a first eccentric region 18 which, when the eccentric shaft rotates, sets the pistons 6 of the first piston row 7 in a reciprocating motion. Furthermore, the eccentric shaft 8 has a second eccentric region 19 which sets the pistons 17 of the second piston row 15 in a reciprocating motion.

As furthermore evident from FIG. 1, for each piston row 7, 15, a dedicated slide ring 20 is provided. In the exemplary embodiment, the slide rings 20 are arranged on the eccentric shaft 8, more precisely on the first eccentric region 18 and second eccentric region 19. The slide rings 20 are situated between the eccentric shaft 8 or eccentric regions 18, 19 and the respective piston row 7 or 15.

In the exemplary embodiment, the two slide rings 20 are shown with identical thickness in the radial direction. It may however also be provided that the slide rings 20 have a different thickness in the radial direction.

As evident from FIG. 1, the radial piston pump I has a further pressure outlet 21 formed in the housing 3. The further pressure outlet 21, which may also be called the second pressure outlet 21, is supplied with pressure medium by the pistons 17 of the second piston row 15.

In the exemplary embodiment, it may be provided that the pressure outlet 14, which may also be called the first pressure outlet 14, and the second pressure outlet 21 serve to deliver pressure medium to the same consumer 2.

However, in the exemplary embodiment, a design is shown in which it is provided that the first pressure outlet 14 is connected to the first consumer 2, and the second pressure outlet 21 is connected to a second consumer 22. Thus the respective pressure outlet 14, 21 can deliver pressure medium to the respective connected consumer 2 or 22.

In the exemplary embodiment, it may be provided that the piston rows 7, 15 are configured such that the volume of pressure medium delivered by the first piston row 7 on a rotation of the eccentric shaft 8 differs from the volume delivered by the second piston row 15. Alternatively and/or additionally, it may also be provided that the radial piston pump 1 is configured such that the pressure of the pressure medium originating from the first piston row 7 differs from the pressure of the pressure medium originating from the further/second piston row 15.

In the exemplary embodiment, for simplification it is provided that the piston rows 7, 15 supply or pressurize the consumers 2, 22 with the same volume and same pressure of the pressure medium on a constant rotation of the eccentric shaft. However, depending on the consumers 2, 22, it may be suitable to select a different volume or different pressure for the respective consumer 2, 22.

The present exemplary embodiment also serves to disclose the method according to the invention for operating a radial piston pump 1.

Operation of the radial piston pump 1 is particularly suitable if the first consumer 2 is a first steerable wheel axle, and the second consumer 22 is a second steerable wheel axle of a utility vehicle (not shown in more detail), in particular an agricultural utility vehicle. In principle, this may also be a vehicle in general.

The method according to the invention is quite particularly suitable if the radial piston pump 1 is configured as an emergency steering pump, wherein the first consumer 2 may be a wheel steering gear or a steering cylinder of a steering device of the first wheel axle, and the second consumer 22 may be a wheel steering gear or steering cylinder of a steering device of the second wheel axle.

Figure 2:
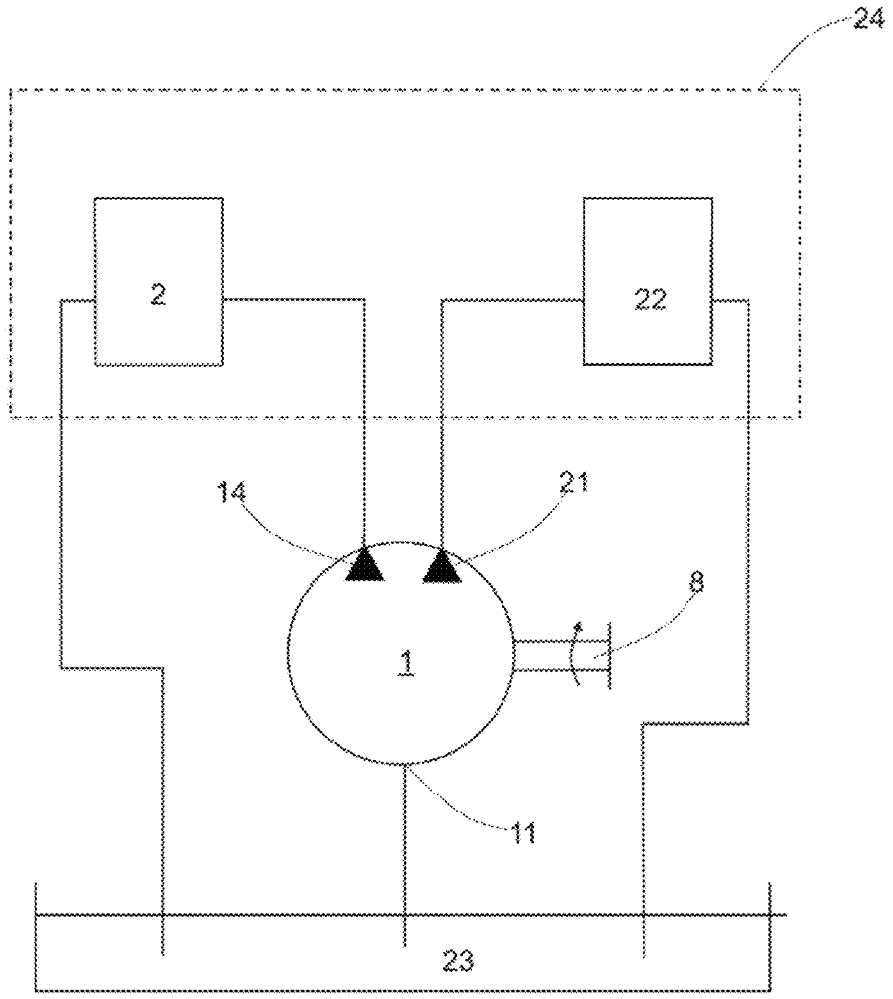
FIG. 2 shows a schematic illustration of the supply of two consumers by a radial piston pump according to the invention.

FIG. 2 illustrates a circuit of the radial piston pump 1, wherein pressure medium flows from a pressure outlet 14 to a first consumer 2 and from there back to a pressure medium reservoir 23. Pressure medium is delivered from the second pressure outlet 21 to the second consumer 22 and from there again back to the pressure medium reservoir 23. FIG. 2 also shows as an example a drive shaft or the eccentric shaft 8.

FIG. 2 also shows that the consumers 2, 22 may be parts of the steering system 24.

The exemplary embodiment also serves to disclose an exemplary steering system 24 for a vehicle, in particular a utility vehicle and quite particularly an agricultural utility vehicle, with at least two steerable wheel axles which, in the exemplary embodiment of FIG. 2, may be the consumers 2, 22. In a manner not shown in detail, the two steerable wheel axles can each be deflected in normal operation by an electric and/or hydraulic steering device which is part of the steering system 24.

The radial piston pump 1 here serves as an emergency steering pump which is configured according to the invention and/or operated using the method according to the invention.

In the context of the steering system 24. pressure lines are provided for supplying a pressure medium delivered by the first piston row 7 to a wheel steering gear or steering cylinder of a steering device of the first wheel axle (=consumer 2). Furthermore, further pressure lines may be provided for supplying a pressure medium delivered by the second piston row 15 to a wheel steering gear or steering cylinder of a steering device of the second wheel axle (=consumer 22).

The radial piston pump 1 shown in FIG. 1 is preferably a suction-regulated radial piston pump with dual-row design. The radially arranged pistons 6, 17 are set in a linearly oscillating reciprocating motion by the common rotating double eccentric shaft 8 in conjunction with springs 25 in the pistons 6, 17. At the bottom dead center of the stroke movement, the preferably radial suction openings—which may be suction bores-in the piston 6 or 17 dip into the suction chamber 10, which may also be described as an eccentric chamber. Under the vacuum created in the cylinder chamber 12 by of the movement of the pistons 6, 17 to the bottom dead center, pressure medium flows into the cylinder chamber 12 when the preferably radial suction openings 9 open. The pressure medium is preferably a hydraulic fluid, in particular an oil.

On movement of the pistons 6, 17 towards the top dead center, the pressure medium is delivered to the pressure outlet 14 or 21 through the pressure openings 13—which may also be called outlet bores—and check valves which are preferably provided (not designated in more detail). Each of the pressure outlets 14, 21 is connected to a piston row 7, 15. This allows the supply of pressure medium to separate consumers 2, 22. The principle of suction regulation allows variable delivery quantities of pressure medium by suitable combinations of piston 6, 17, slide ring 20 and the eccentricity of the eccentric shaft 8. Thus it is possible to provide different delivery quantities for the respective circuits. Because of the common drive, the eccentric shaft 8 and the suction port 11, a flexible dual-circuit configuration is possible with compact construction.

LIST OF REFERENCE SIGNS

1 Radial piston pump
2 (First) consumer
3 Housing
4 Longitudinal axis
5 Cylinder bore
6 Piston
7 (First) piston row
8 Eccentric shaft
9 Suction openings
10 Suction chamber
11 Suction port
12 Cylinder chamber
13 Pressure openings
14 (First) pressure outlet
15 (Further/second) piston row
16 (Further) cylinder bores
17 (Further) pistons (of 15)
18 First eccentric region
19 Second eccentric region
20 Slide ring
21 (Further/second) pressure outlet
22 (Second) consumer
23 Pressure medium reservoir
24 Steering system
25 Springs
Q Volume
P Pressure

What is claimed is:

1. A radial piston pump for delivering a pressure medium to a consumer, said pump comprising:

an eccentric shaft having a longitudinal axis;

a housing having first cylinder bores which are arranged radially to the longitudinal axis, the housing further having (i) a suction port supplied with the pressure medium, (ii) a suction chamber which is supplied with the pressure medium through the suction port, and (iii) a first pressure outlet;

a respective first piston disposed radially displaceably in each of the first cylinder bores, the first pistons being arranged in a first piston row which lies in a radial plane, each of the first pistons having a respective suction opening, the eccentric shaft being mounted in the housing for rotation about the longitudinal axis for moving the first pistons in a first linearly oscillating reciprocating motion having a top dead center and a bottom dead center, and wherein, in a region of the bottom dead center of the first linearly oscillating reciprocating motion, the pressure medium flows into cylinder chambers through the suction openings of the first pistons, and wherein the pressure medium flows out of the cylinder chambers to the first pressure outlet through pressure openings owing to movement of the first pistons towards the top dead center of the first linearly oscillating reciprocating motion; and wherein further cylinder bores are provided in the housing and a respective second piston is disposed radially displaceably in each of the further cylinder bores, the second pistons being arranged in at least one further piston row which is located planar-parallel to the first piston row, and wherein the eccentric shaft moves the second pistons of the further piston row in a second linearly oscillating reciprocating motion;

and wherein the radial piston pump is configured as an emergency steering pump for a vehicle and wherein the first piston row is configured to deliver the pressure medium to a wheel steering gear or a steering cylinder of a steering system of a first wheel axle of the vehicle, and the further piston row is configured to deliver the pressure medium to a wheel steering gear or a steering cylinder of a steering system of a second wheel axle of the vehicle.

2. The radial piston pump according to claim 1, wherein the eccentric shaft includes at least one first eccentric region which moves the first pistons of the first piston row in the first linearly oscillating reciprocating motion and wherein the eccentric shaft further includes at least one second eccentric region which moves the second pistons of the further piston row in the second linearly oscillating reciprocating motion.

3. The radial piston pump according to claim 1, wherein the pressure medium flows into cylinder chambers from the suction chamber through suction openings formed in the pistons of the further piston row in the region of a bottom dead center of the stroke movement, and wherein the pressure medium flows out of the cylinder chambers via pressure openings owing to a movement of the pistons towards the top dead center.

4. The radial piston pump according to claim 1, wherein the housing includes a further pressure outlet and the second pistons of the further piston row deliver the pressure medium to the further pressure outlet.

5. The radial piston pump according to claim 1, wherein the first piston row and the further piston row are configured such that a volume of the pressure medium delivered by the first piston row upon a rotation of the eccentric shaft differs from a volume of the pressure medium delivered by the further piston row upon the rotation of the eccentric shaft.

6. The radial piston pump according to claim 1, further comprising a dedicated first slide ring arranged between the eccentric shaft and the first piston row and a dedicated second slide ring arranged between the eccentric shaft and the further piston row.

7. The radial piston pump according to claim 6, wherein a thickness of the first slide ring in a radial direction differs from a thickness of the second slide ring in the radial direction.

8. A method for operating a radial piston pump for delivering a pressure medium to a first consumer, wherein the radial piston pump has a housing in which cylinder bores are arranged radially to a longitudinal axis and in each of which a respective radially displaceable first piston is arranged, wherein the pistons form a first piston row lying in a radial plane, and wherein the first pistons are set in a linearly oscillating reciprocating motion by rotation of an eccentric shaft mounted in the housing for rotation about the longitudinal axis, and wherein the pressure medium flows into cylinder chambers through suction openings of the first pistons in the region of a bottom dead center of the motion, from a suction chamber which is supplied with the pressure medium through a suction port under a vacuum created by the movement of the first pistons towards a bottom dead center of the motion, and wherein the pressure medium is delivered via pressure openings to a first pressure outlet on movement of the first pistons towards the top dead center, and wherein at least one further piston row is provided planar-parallel to the first piston row, and further cylinder bores are provided in the housing, in each of which a respective second piston of the further piston row is radially displaceably arranged, and the second pistons of the further piston row are set in a linearly oscillating reciprocating motion by rotation of the eccentric shaft, whereupon the pressure medium delivered by the first piston row is supplied to the first consumer and the pressure medium delivered by the further piston row is supplied to a second consumer, the first consumer being a first steering system of a first steerable wheel axle of a vehicle and the second consumer being a steering system of a second steerable wheel axle of the vehicle.

9. The method according to claim 8, wherein a volume of the pressure medium which the first piston row delivers upon a rotation of the eccentric shaft differs from a volume of the pressure medium delivered by the further piston row upon the rotation of the eccentric shaft.

10. A steering system for a vehicle of the type having at least a first steerable wheel axle which in normal operation can be deflected by a first steering device and a second steerable wheel axle which in normal operation can be deflected by a second steering device, said system, comprising:

an emergency pump configured as a radial piston pump, the radial pump including:

(a) an eccentric shaft having a longitudinal axis;

(b) a housing having first cylinder bores which are arranged radially to the longitudinal axis, the housing further having (i) a suction port supplied with a pressure medium, (ii) a suction chamber which is supplied with the pressure medium through the suction port and (iii) a first pressure outlet, and (c) a respective first piston disposed radially displaceably in each of the first cylinder bores, the first pistons being arranged in a first piston row which lies in a radial plane, each of the first pistons having a respective suction opening, the eccentric shaft being mounted in the housing for rotation about the longitudinal axis for moving the first pistons in a first linearly oscillating reciprocating motion having a top dead center and a bottom dead center, and wherein, in a region of the bottom dead center of the first linearly oscillating reciprocating motion, the pressure medium flows into cylinder chambers through the suction openings of the first pistons, and wherein the pressure medium flows out of the cylinder chambers to the first pressure outlet through pressure openings owing to movement of the first pistons towards the top dead center of the first linearly oscillating reciprocating motion; and wherein further cylinder bores are provided in the housing and a respective second piston is disposed radially displaceably in each of the further cylinder bores, the second pistons being arranged in at least one further piston row which is located planar-parallel to the first piston row, and wherein the eccentric shaft moves the second pistons of the further piston row in a second linearly oscillating reciprocating motion; and wherein said system further comprises first pressure lines to supply the pressure medium delivered by the first piston row to a wheel steering gear or a steering cylinder of the first steering device of the vehicle, and further pressure lines to supply the pressure medium delivered by the further piston row to a wheel steering gear or a steering cylinder of the second steering device of the vehicle.

11. The radial piston pump according to claim 1, wherein the first piston row and the further piston row are configured such that a pressure of the pressure medium originating from the first piston row differs from a pressure of the pressure medium originating from the further piston row.

12. The method according to claim 8, wherein the radial piston pump is an emergency steering pump of the vehicle and wherein the first consumer comprises a first wheel steering gear of the first steering system of the first steerable wheel axle of the vehicle and the second consumer comprises a second wheel steering gear of the second steering system of the second steerable wheel axle of the vehicle.

13. The method according to claim 8, wherein the radial piston pump is an emergency steering pump of the vehicle and wherein the first consumer comprises a first steering cylinder of the first steering system of the first steerable wheel axle and the second consumer comprises a second steering cylinder of the second steering system of the second wheel axle.

14. A radial piston pump for delivering a pressure medium to a consumer, said pump comprising:

an eccentric shaft having a longitudinal axis;

a housing having first cylinder bores which are arranged radially to the longitudinal axis, the housing further having (i) a suction port supplied with the pressure medium, (ii) a suction chamber which is supplied with the pressure medium through the suction port, and (iii) a first pressure outlet;

a respective first piston disposed radially displaceably in each of the first cylinder bores, the first pistons being arranged in a first piston row which lies in a radial plane, each of the first pistons having a respective suction opening, the eccentric shaft being mounted in the housing for rotation about the longitudinal axis for moving the first pistons in a first linearly oscillating reciprocating motion having a top dead center and a bottom dead center, and wherein, in a region of the bottom dead center of the first linearly oscillating reciprocating motion, the pressure medium flows into cylinder chambers through the suction openings of the first pistons, and wherein the pressure medium flows out of the cylinder chambers to the first pressure outlet through pressure openings owing to movement of the first pistons towards the top dead center of the first linearly oscillating reciprocating motion; and wherein further cylinder bores are provided in the housing and a respective second piston is disposed radially displaceably in each of the further cylinder bores, the second pistons being arranged in at least one further piston row which is located planar-parallel to the first piston row, and wherein the eccentric shaft moves the second pistons of the further piston row in a second linearly oscillating reciprocating motion, and wherein the pressure medium delivered by the first piston row is supplied to a first consumer and the pressure medium delivered by the further piston row is supplied to a second consumer, the first consumer being a first steering system of a first steerable wheel axle of a vehicle and the second consumer being a steering system of a second steerable wheel axle of the vehicle.

* * * * *